June 10, 1941.　　　G. A. JONES　　　2,244,782
STORAGE TANK FOR INFLAMMABLE LIQUIDS
Filed Nov. 2, 1937　　　7 Sheets-Sheet 1

INVENTOR.
GEORGE ALLAN JONES.
ATTORNEY. Percy Hadden

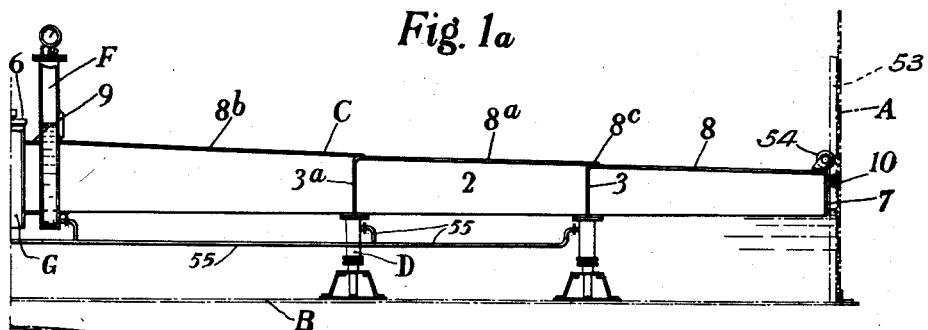
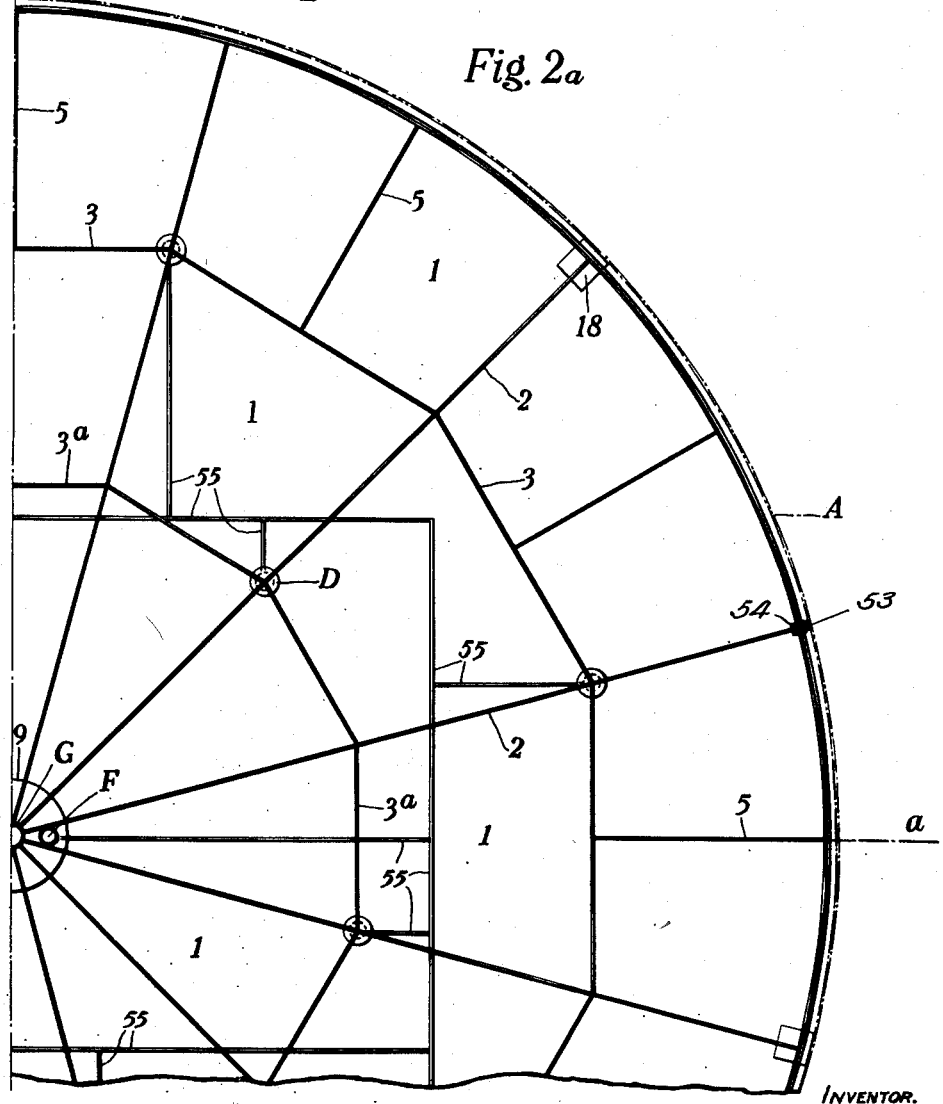

June 10, 1941. G. A. JONES 2,244,782
STORAGE TANK FOR INFLAMMABLE LIQUIDS
Filed Nov. 2, 1937 7 Sheets-Sheet 5

INVENTOR.
GEORGE ALLAN JONES.
ATTORNEY.

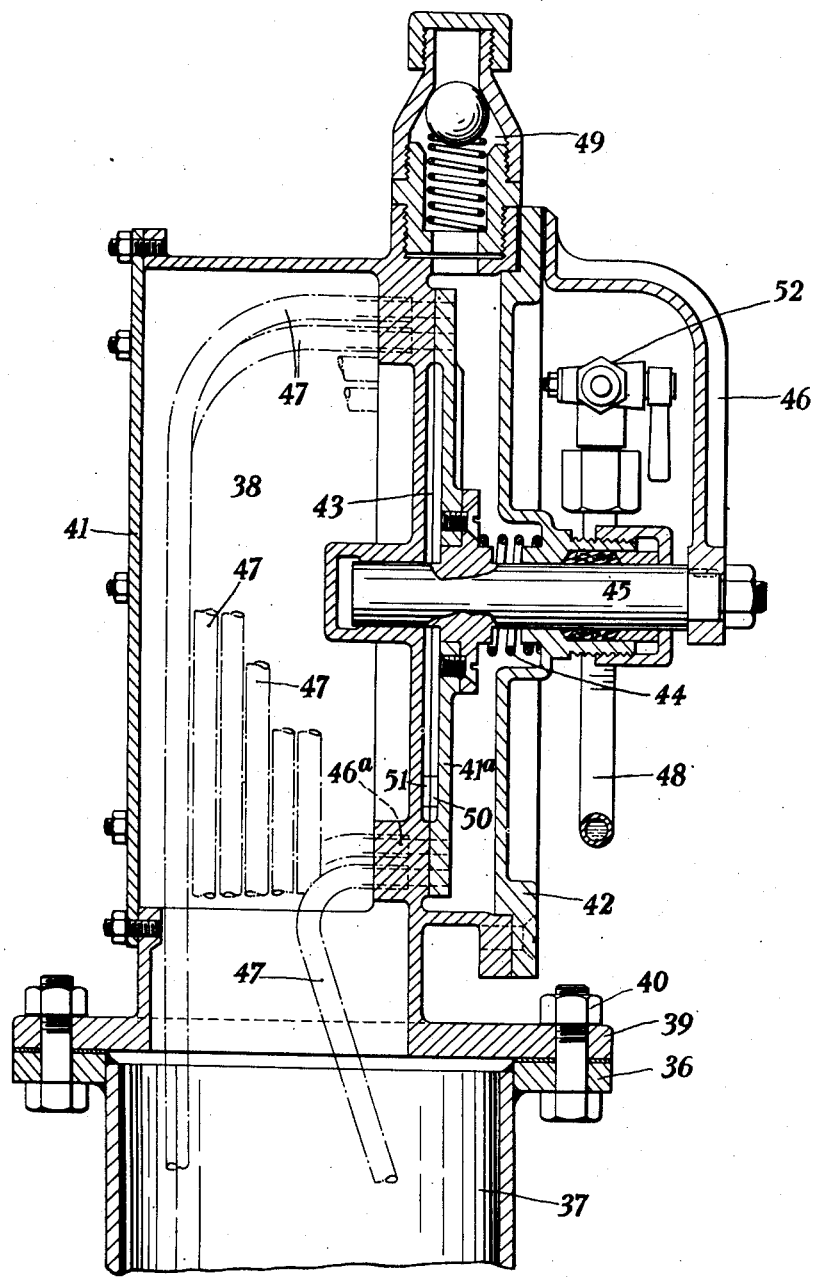

Patented June 10, 1941

2,244,782

UNITED STATES PATENT OFFICE 2,244,782

STORAGE TANK FOR INFLAMMABLE LIQUIDS

George Allen Jones, Melbourne, Victoria, Australia

Application November 2, 1937, Serial No. 172,452
In Australia November 25, 1936

4 Claims. (Cl. 220—26)

This invention relates to storage tanks for inflammable liquids and one object of my invention is to provide a floating roof for such tanks which is of rigid construction this being effected by forming the roof of a number of compartments or cells closed at their tops and sides but open at the bottom.

I provide means whereby the pressure in any one of the said cells or compartments can be tested when required and to equalize the pressure in all the cells. Tests can be made while the tank is in use.

I will now described with reference to the accompanying drawings an example of construction of my improved floating roof for liquid storage tanks and its associated parts.

In these drawings:

Fig. 1 continued by Fig. 1a (Sheet 2) is a vertical section of the floating roof on line a—a of Fig. 2 and 2a.

Fig. 2 continued by Fig. 2a (Sheet 2) is a partial plan view of the roof.

Fig. 8 is a vertical section taken on line b—b of Fig. 7.

Figure 1:
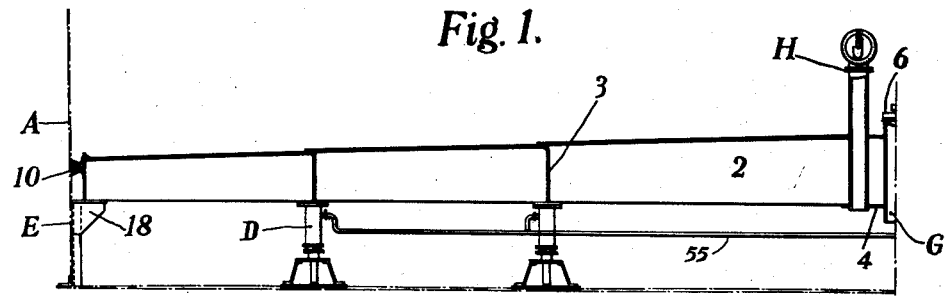
Figure 2:
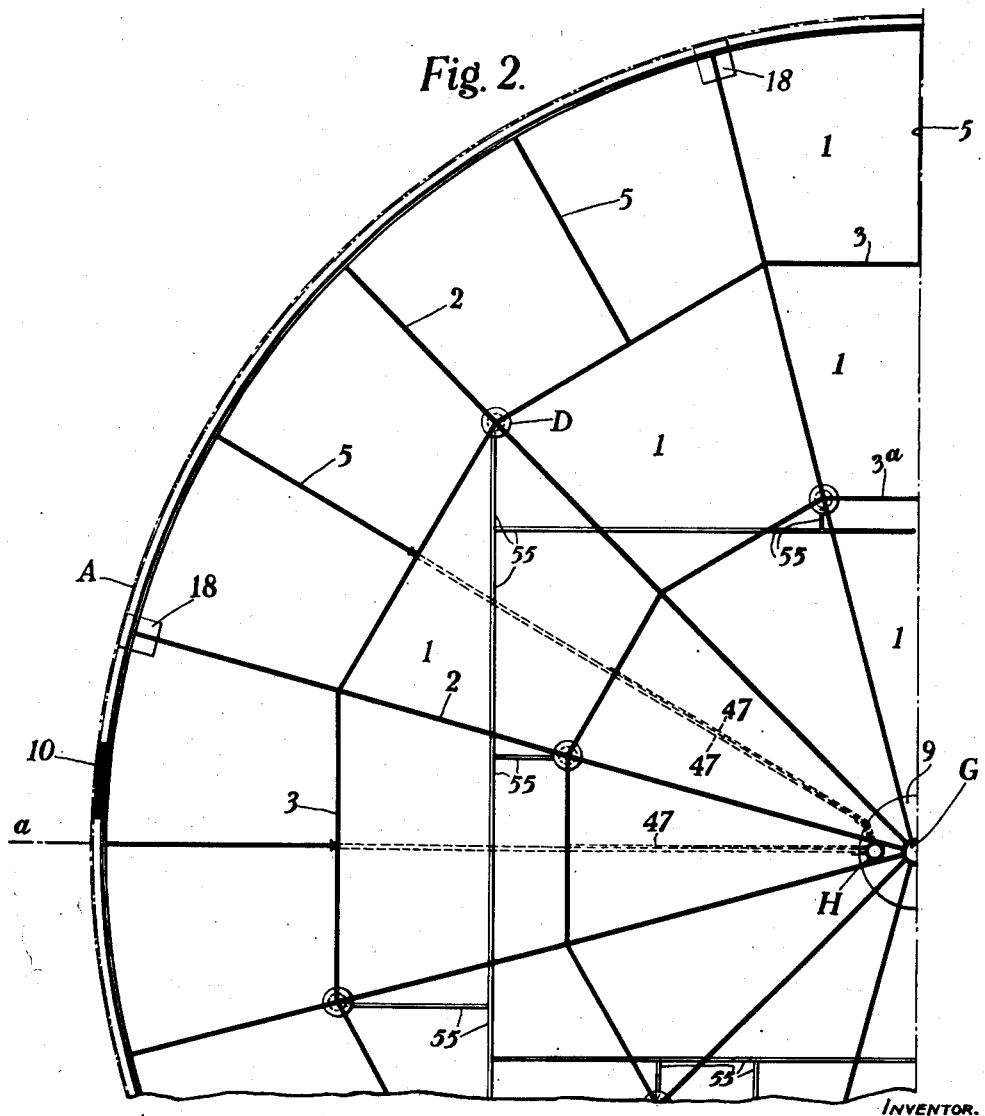

Referring to Figs. 1 to 2a A indicates the wall of shell of the tank, B the bottom surface of the tank which is shown to be flat but in practice would be cambered or irregular, C the floating roof. D the intermediate hydraulic supports for the roof—E bracket peripheral supports therefor. F the hydro-pneumatic accumulator. G the central dip hatch and tube and H the air equalizing valve.

The roof C is formed of a number of cells or compartments 1 these being closed at the sides and top but open at the bottom.

These cells are formed by radial main ribs 2 and connecting or cross partitions 3 and 3a. The inner ends of the main ribs 2 are welded to the central dip hatch or tube G and also to the horizontal disc 4 and 9 forming central junction plates. The tube G is provided with a cover 6.

In order to increase the number of the outer cells or compartments short radial ribs 5 are provided as shown in Figs. 2, 2a intermediate of the main ribs 2.

The height of the ribs is greater at the center of the roof than at the periphery thereof, the height gradually decreasing thus providing for a fall of the deck of the roof from its center outwards, to shed water as can be understood from Figs. 1 and 1a.

The roof is provided with a skirt formed by a depending ring 7 and the deck is formed of sheets 8, 8a and 8b fitted between the main ribs. The sheets 8 and 8a are folded over at their inner ends to form the vertical cross partitions 3 and 3a and are welded to the main ribs and to one another as at 8c. The inner sheets 8b are flat and are welded to the disc 9, to the sheets 8a and to one another.

The tube G extends below the bottoms of the ribs so as to be liquid sealed when the roof is floating. The various parts of the roof above described are made of mild steel and all permanent joints and connections welded.

Figure 3:
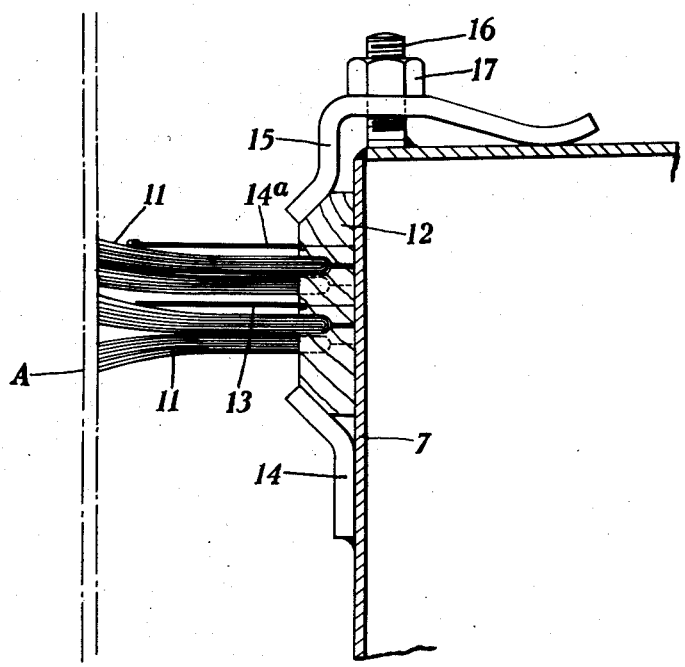
Fig. 3 is a detail view in sectional elevation of the sealing means between the periphery of the roof and the wall of the tank.

To prevent entry of air between the skirt 7 of the roof and the wall A of the tank I provide annular sealing means 10 of which Fig. 3 illustrates the construction in cross section.

The sealing means is of a known type and comprises superposed brushes formed of knots constructed of hair, fibre, bristle or other suitable material, these knots being set in two or more rows in stocks formed of metal, wood or other material impervious to the action of inflammable gas.

I make no claim to the sealing means herein described and illustrated in the accompanying drawings.

The brush stocks are in short lengths of about 12 inches with the ends mitred, scarfed or otherwise shaped so that they will fit tightly to one another to form gas-tight joints in the continuous ring formed by the stocks.

Between the rows of knots I fix metal or fabric diaphragms 13 extending beyond one end of one stock and overlapping the adjoining stock.

The top of the brushes will be protected by a sheet of 30 mesh bronze gauze 14a.

The stocks 12 are fixed to the skirt 7 of the roof by means of clip 14 welded to the skirt and removable clips 15 of the shape illustrated these being held down by means of threaded studs 16 welded to the roof and extending through the clips which are secured by nuts 17.

When not afloat, roofs of a lesser diameter than 30 feet may be supported on brackets 18 only (Fig. 1) attached to the inner surface of the wall A of the tank at a sufficient height above the bottom to permit workmen to work underneath. These supporting brackets are located to coincide with the main ribs 2.

In roofs of a larger diameter I provide intermediate hydraulic supports D in addition to the above described supporting brackets.

I now make no claim to these hydraulic supports or to a hydro-pneumatic device associated therewith, both of which are hereinafter described and illustrated in the accompanying drawings.

These intermediate supports D are situated at predetermined distances from the center of the roof and are designed to bear proportions of the weight of the roof equal to the rim supports. They are located at the intersection of the ribs 2 and the cross partitions 3 and 3a as shown in Fig. 1 and are constructed as shown in detail in Fig. 6.

Figure 6:
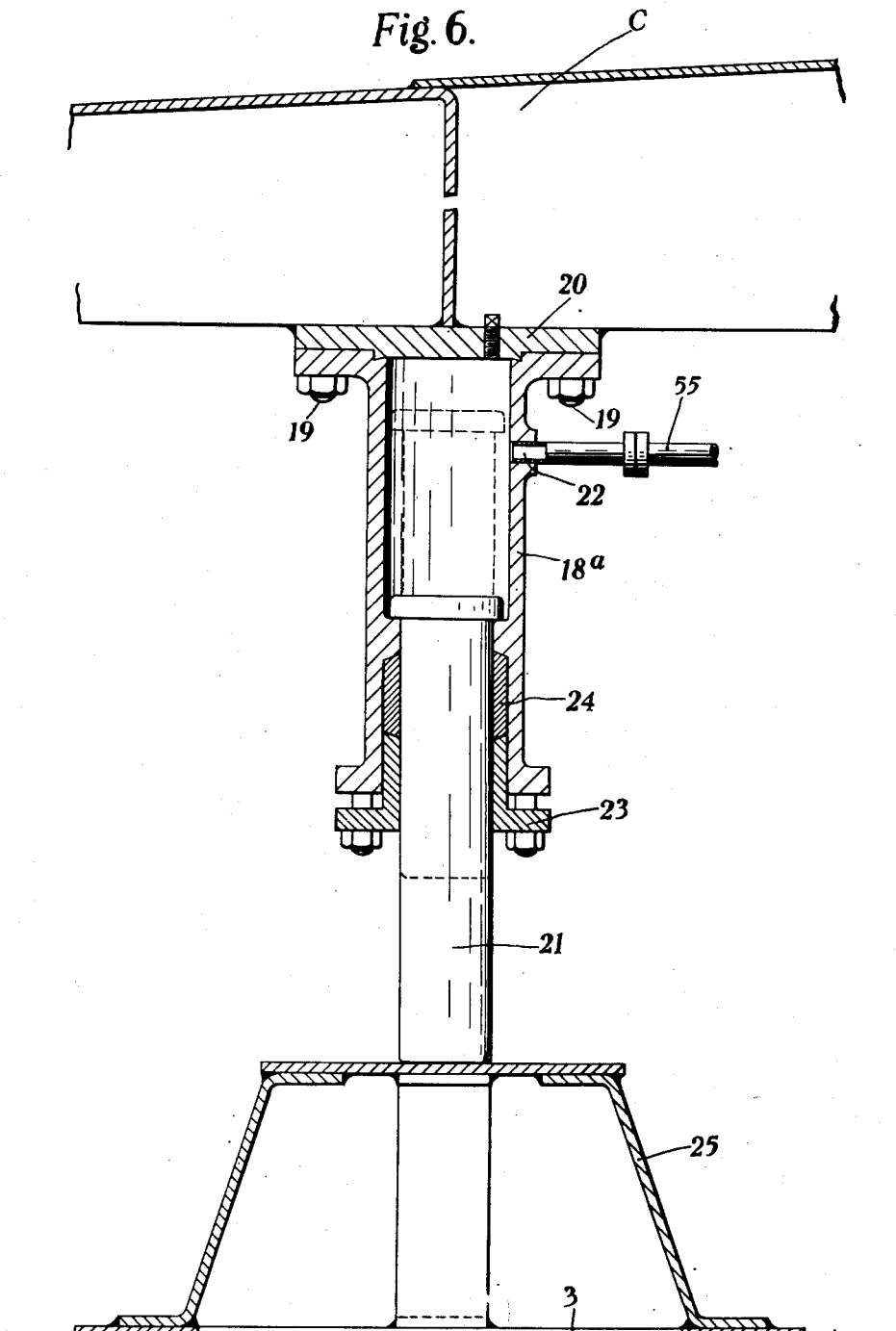
Fig. 6 is a similar view of one of the intermediate hydraulic supports of the roof.

A suitable construction for these hydraulic supports is shown in Fig. 6.

A hydraulic cylinder 18a of cast or mild steel is bolted by bolts 19 to a plate 20 welded at all points of contact to the roof members. Within the cylinder 18a is a slidable ram 21 the cylinder being fed with water through the pipe 22 a suitable gland 23 and packing 24 being provided the feed to the cylinders of the respective supports being governed by the accumulator F.

Immediately below the position of each ram a stool 25 is attached to the tank bottom to distribute the weight of the roof over the foundation.

In Fig. 6 the roof is shown in a position when during its downward movement the end of a ram 21 has meet the top of its stool 25 and in continuing this downward movement the roof will come to rest on the peripheral brackets 18 while the rams of the respective intermediate supports D will slide into their cylinders 18a as indicated in broken lines in Fig. 6 until the load is equalized over the roof by the intermediate supports in spite of any irregularities or unevenness of the tank bottom.

Figure 5:
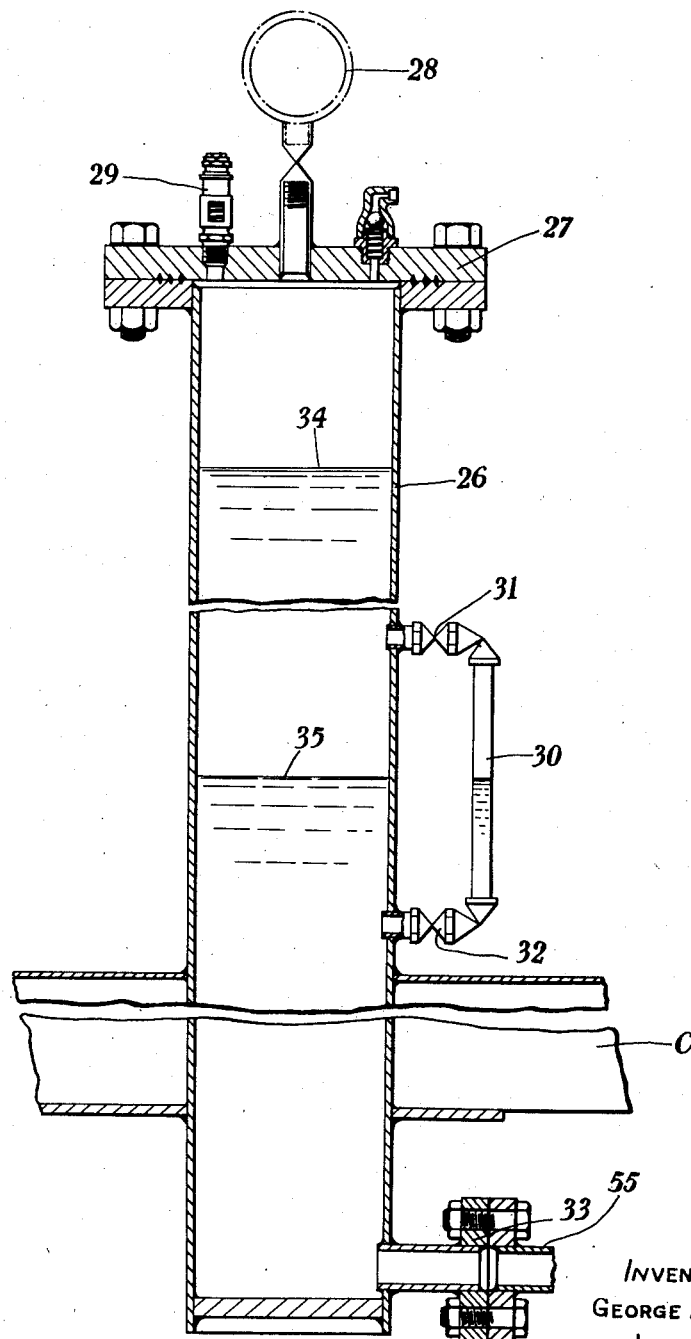
Fig. 5 is a vertical section showing the details of the hydro-pneumatic accumulator.

A suitable construction of the hydro-pneumatic accumulator F is shown in Fig. 5.

Figure 4:
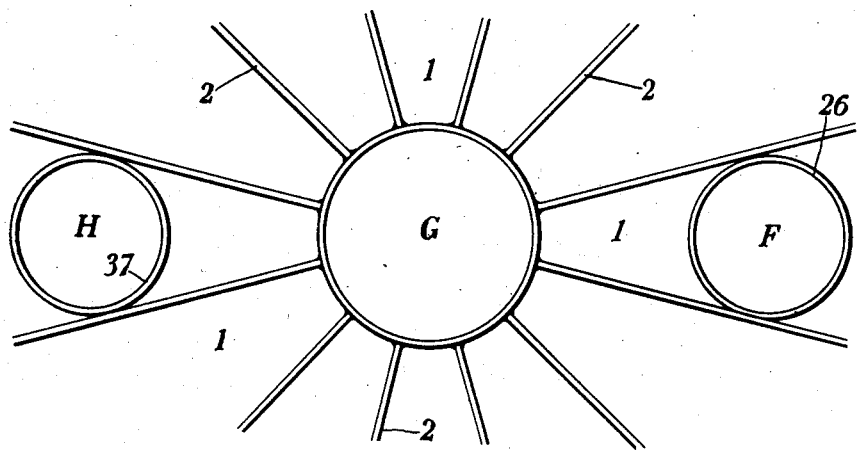
Fig. 4 is a horizontal section showing the positions of an air equalizing valve, a central dip hatch and tube and a hydro-pneumatic accumulator.

It comprises a steel cylinder closed at each end and welded into the roof between two main ribs 2 as shown in Fig. 4. This cylinder is partially filled with water up to a determined level at atmospheric pressure at the upper portion and then filled with compressed air. The cover 27 is provided with a pressure gauge 28 and a relief valve 29 which is adjusted to blow off at the calculated working pressure necessary to cause each intermediate support D to bear its correct proportion of the roof load. 30 is a water gauge with valves 31 and 32 diagrammatically shown and 33 is the connection for the hydraulic inlet pipe 34 diagrammatically shows the water level when the roof is fully supported on the rams 21 (Fig. 6) and 35 similarly indicates the normal water level.

Figure 7:
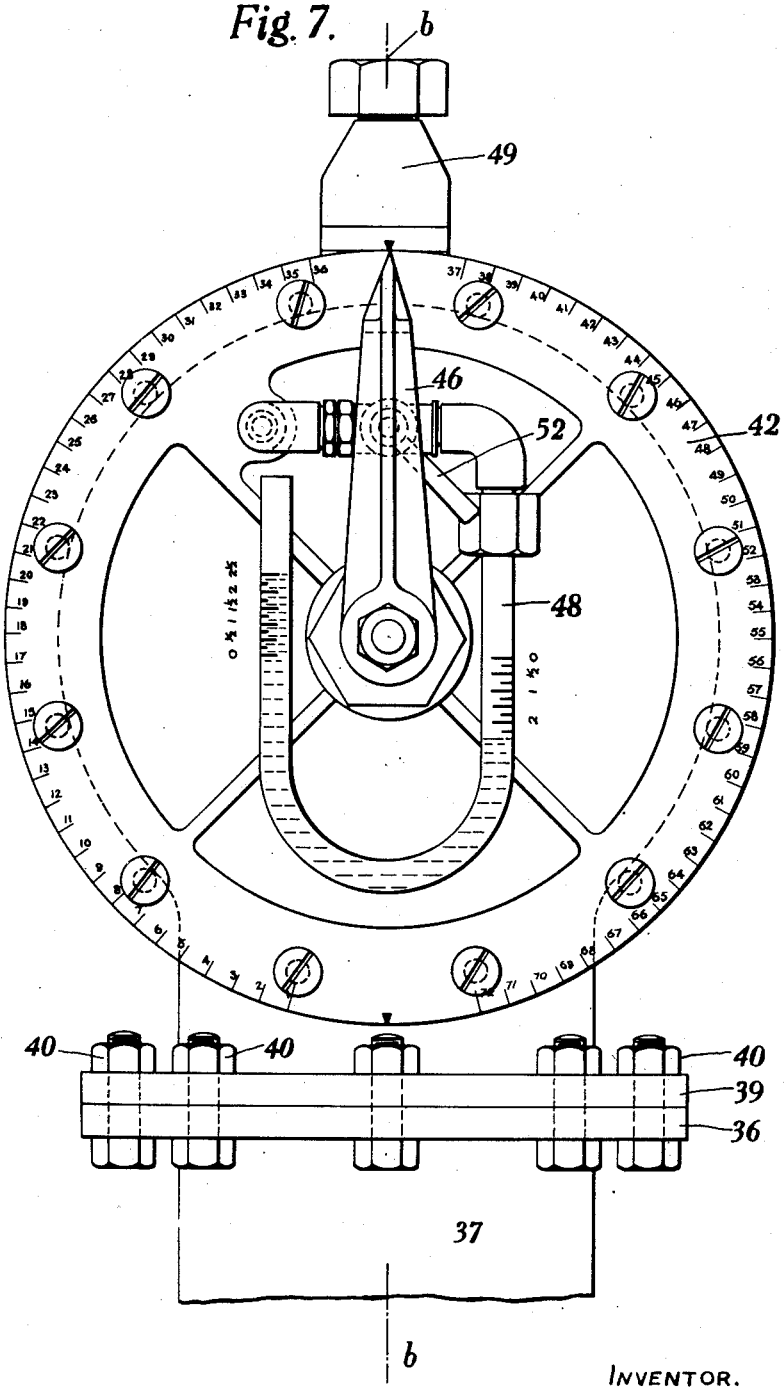
Fig. 7 is a front elevation of the equalizing valve.

An example of construction of the air equalizing valve H is illustrated in Figs. 7 and 8 of which Fig. 7 is a front view and Fig. 8 is a vertical cross section.

On the top flange 36 of tube 37 is mounted the air equalizing valve. This comprises a metal body 38 flanged at the bottom as at 39 for connection to the tube flange 37 by means of bolts 40. The body 38 has a back cover 41 a front cover 42 and an internal valve face 43. A valve disc 41a is arranged so as to be capable of being turned about its center while being in contact with the face 43 and is held in contact therewith by spring 44 and is turnable on a spindle 45 actuated by a pointer arm 46.

The valve face 43 is provided with a number of ports 46a formed therein the number being equal to the number of cells in the roof, the said ports being in one or more rows. A tube such as 47 leads from each cell to each port.

The valve disc 41a is provided with one or more ports to correspond with the number of rows of ports in the valve face 43.

A hydrostatic gauge 48 is connected to the front cover 42 of the body 38 and is provided with a series of numerals on the rim to indicate the position of the corresponding ports in the valve face 43 with relation to the ports in the valve disc 41a.

To test the air pressure in any roof cell 1 the pointer arm 46 is turned until it coincides with the cell number on the cover 42 thus bringing the ports in the valve face 43 and valve disc 41a into juxtaposition and connecting the particular cell to the gauge 48. Air can be blown into any cell for testing purposes in the same way through the valve through the inlet valve 49.

To place all cells into communication with one another to equalize the pressure in all, the valve disc 41a is turned through 180° so that an inclined face 50 on said disc will make contact with a similar one 51 on the internal valve face 43 and cause the disc 41a to separate from the valve face 43. 52 indicates the cock of the gauge 48.

The center tube or dip hatch O is used as the dip pipe, and the cover 6 is hinged having the hinge pin outside the center of gravity.

A foot plate is cast on the cover, by means of which the dip hatch will be kept open when in use, the cover being automatically closed when released.

For all roofs in excess of 30 feet in diameter, I provide guides 53 running up the inside wall of the tank these guides extending the full height of the tank.

The roof is provided with grooved pulleys 54 located over the main ribs 2 and adapted to run on the said guides and prevent rotation of the roof so that the intermediate supports D will land on the stools when the roof is lowered.

In practice I provide a ladder to give access to the floating roof this ladder being mounted on the wind girder of the tank and consisting of a number of treads strung on chain stringers.

The ladder when not in use would be coiled on a winch drum mounted on the wind girder, and is lowered as required to within 9 inches from the roof level and pegged in position so that no portion of the ladder is at any time carried on the roof itself.

The ladder would be guided by means of two wire ropes extending from the bottom of the tank to brackets attached to the top thereof.

The above described ladder is not illustrated in the drawings as the construction thereof can be readily understood without illustration.

The reference figure 55 in Figs. 1, 1a, 2, 2a indicates the hydraulic conduit installation whereby the accumulator F is in communication with all the hydraulic supports D connections of said conduit installation being made to the pipe 33 shown in Fig. 5 of the accumulator and to each of the pipes 22 (Fig. 6) of the various hydraulic supports.

From the foregoing description it can be seen that my floating roof is of rigid construction, effectually air sealed at its periphery and evenly supported without the presence of unequal stresses over its area, both when floating and when not afloat, thus providing for good and durable working.

What I claim as my invention and desire to secure by Letters Patent of the United States is:

1. In a storage tank for inflammable liquids, a floating roof formed of contiguous cells closed at the top and sides and open at the bottom, said cells constituting air chambers when the roof is afloat, a valve device carried by said roof for testing the pressure of the air in any one of said chambers and for equalizing the pressure in all of said chambers and conduits connecting said chambers to said valve device.

2. In a storage tank for inflammable liquids, a floating roof formed of contiguous cells closed at the top and sides and open at the bottom, said cells constituting air chambers when the roof is afloat, an air equalizing valve having a valve face provided with ports of a number equal to the number of the cells constituting the roof, a tube connecting each of said ports to one of said cells, a valve disc provided with ports turnable about its center in contact with said valve face, a hydrostatic gauge, means for turning said valve disc to connect any individual roof cell to said gauge, means for placing all the cells into communication with one another to equalize the pressure in all, and an air inlet valve mounted on said air equalizing valve.

3. In a circular storage tank for inflammable liquids, a circular cellular floating roof therefor of lesser diameter than the tank and having a deck sloping downwards from the center thereof to its circumference the said deck forming the tops of the cells, a central vertical dip hatch tube, vertical ribs extending radially from the outer wall of said tube, vertical partitions transverse to said ribs and a peripheral skirt constituting with said deck the cells of the roof open at the bottom and closed at the top and sides, and means for testing and equalizing the pressure of the air in said cells when the roof is afloat.

4. In a circular storage tank for inflammable liquids, a circular cellular floating roof therefor of lesser diameter than the tank and having a deck sloping downwards from the center thereof to its circumference the said deck forming the tops of the cells, a central vertical dip hatch tube, vertical ribs extending radially from the outer wall of said tube, vertical partitions transverse to said ribs and a peripheral skirt constituting with said deck the cells of the roof open at the bottom and closed at the top and sides, means for testing and equalizing the pressure of the air in said cells when the roof is afloat, supports for the roof when not afloat co-operating with said radial ribs and means preventing rotary movement of said roof to ensure said co-operation.

GEORGE ALLEN JONES.